Patented Sept. 20, 1932

1,878,462

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PROCESS OF MAKING BENZOIC ACID

No Drawing. Application filed October 30, 1926, Serial No. 145,375. Renewed February 4, 1931.

This invention relates more particularly to the preparation of benzoic acid, and it is among the objects of the invention to provide a method which is efficient and reliable, and which assures elimination of contaminations. Other objects and advantages will appear as the description proceeds.

To the accomplishment of the foregoing and related ends, the invention, then, consists of the features hereinafter fully described, and particularly pointed out in the claims, the following description setting forth in detail but one of the various ways in which the principle of the invention may be used.

In proceeding in accordance with my invention, toluene is chlorinated in the presence of a phosphorus halide, e. g. phosphorus tri-chloride, and at a temperature for instance between the boiling point of toluene and 170° C. The benzo-tri-chloride so formed is fractionally distilled in a superrefractionator, and the purified product is then treated with water in the proportion of about 195 parts by weight of the tri-chloride to 18 of water, or molecular proportions, at a temperature preferably about 90°C., and in the presence of iron chloride, $FeCl_3$, in small amount, e. g., .1–1%, preferably about one-half of one per cent. The resulting product is now preferably distilled with careful fractionation and the purified benzoyl chloride is then treated with boiling water, for example, in proportion of about 4 parts of water to 1 part thereof. In some cases, I may add alkali or alkali carbonate, or alkaline earth carbonate, (such as calcium carbonate), to the water.

The liquid is cooled and benzoic acid precipitates and is separated out by filtration. Purification may be effected further by sublimation.

The present procedure has the pronounced advantages of providing elimination of contaminations as formed, and almost all the chlorine used is recovered as hydrochloric acid, furthermore where no alkali is employed, the matter of manufacturing equipment is simplified.

While the product obtained by the chlorination of toluene in the manner described is predominately benzo-trichloride, such product will also contain as impurities benzyl chloride, benzal chloride, chlor-benzyl chloride, chlor-benzal chloride and chlor-benzo-trichloride. The result of the fractional distillation of the foregoing product is to separate the benzo-trichloride from most of the impurities in question; however, even with good fractionation, the impurities such as chlor-benzyl chloride and chlor-benzal chloride will remain in small quantities, their boiling points being very close to that of benzo-trichloride. Accordingly, if such benzo-trichloride containing these impurities were hydrolyzed directly to benzoic acid, the latter would not be obtained halogen free. However, as a result of the first hydrolyzing step, not only is the benzo-trichloride hydrolyzed to benzoyl chloride, but the foregoing retained impurities will be hydrolyzed to a slight extent, e. g., to chlor-benzyl alcohol and chlor-benzaldehyde. Accordingly, as a result of the second fractional distillation step, very pure benzoyl chloride is obtained, since these hydrolyzed impurities are more readily separable therefrom than were the original impurities from the benzo-trichloride. Furthermore, any products resulting from the catalyst employed in such hydrolysis will be likewise eliminated from the benzoyl chloride.

Further hydrolysis of the benzoyl chloride which is thus obtained in an exceptionally pure state is accomplished, it will be noted, without the employment of any catalyst whatsoever and accounts for the pure state of the benzoic acid obtained as the final product.

Other modes of applying the principle of the invention may be employed, change being made as regards the details described, provided the step or steps stated in any of the following claims, or the equivalent of such, be used.

I therefore particularly point out and distinctly claim as my invention:—

1. A process of making benzoic acid, which comprises chlorinating toluene, fractionating the chlorinated product to obtain a substantially pure benzotrichloride and treating it with an approximately equi-molecular proportion of water in the presence of iron chloride, then fractionally distilling and subjecting the benzoyl chloride fraction to the action of boiling water.

2. A process of making benzoic acid, which comprises chlorinating toluene, fractionally distilling the chlorinated product to obtain a substantially pure benzotrichloride and treating the same with an approximately equi-molecular proportion of water in the presence of iron chloride, then fractionally distilling and subjecting the benzoyl chloride fraction to the action of boiling water and calcium carbonate.

3. A process of making benzoic acid, which comprises chlorinating toluene in the presence of a phosphorous compound at a temperature ranging from the boiling point of toluene to 170° C., fractionally distilling the chlorinated product and treating the benzotrichloride so formed with an approximately equi-molecular proportion of water at a temperature of about 90° C. in the presence of iron chloride, then fractionally distilling and subjecting the benzoyl chloride formed to the action of boiling water.

4. In a process of making benzoic acid, the steps which consist in halogenating toluene to produce chiefly benzo-tri-halide, purifying the latter by fractional distillation, hydrolyzing the same to benzoyl halide, purifying the latter by fractional distillation, and then hydrolyzing such purified benzoyl halide to benzoic acid.

5. In a process of making benzoic acid, the steps which consist in chlorinating toluene to produce chiefly benzo-tri-chloride, purifying the latter by fractional distillation, hydrolyzing the same to benzoyl chloride, purifying the latter by fractional distillation, and then hydrolyzing such purified benzoyl chloride to benzoic acid.

Signed by me this 21st day of October, 1926.

EDGAR C. BRITTON.